United States Patent Office 3,384,288
Patented May 21, 1968

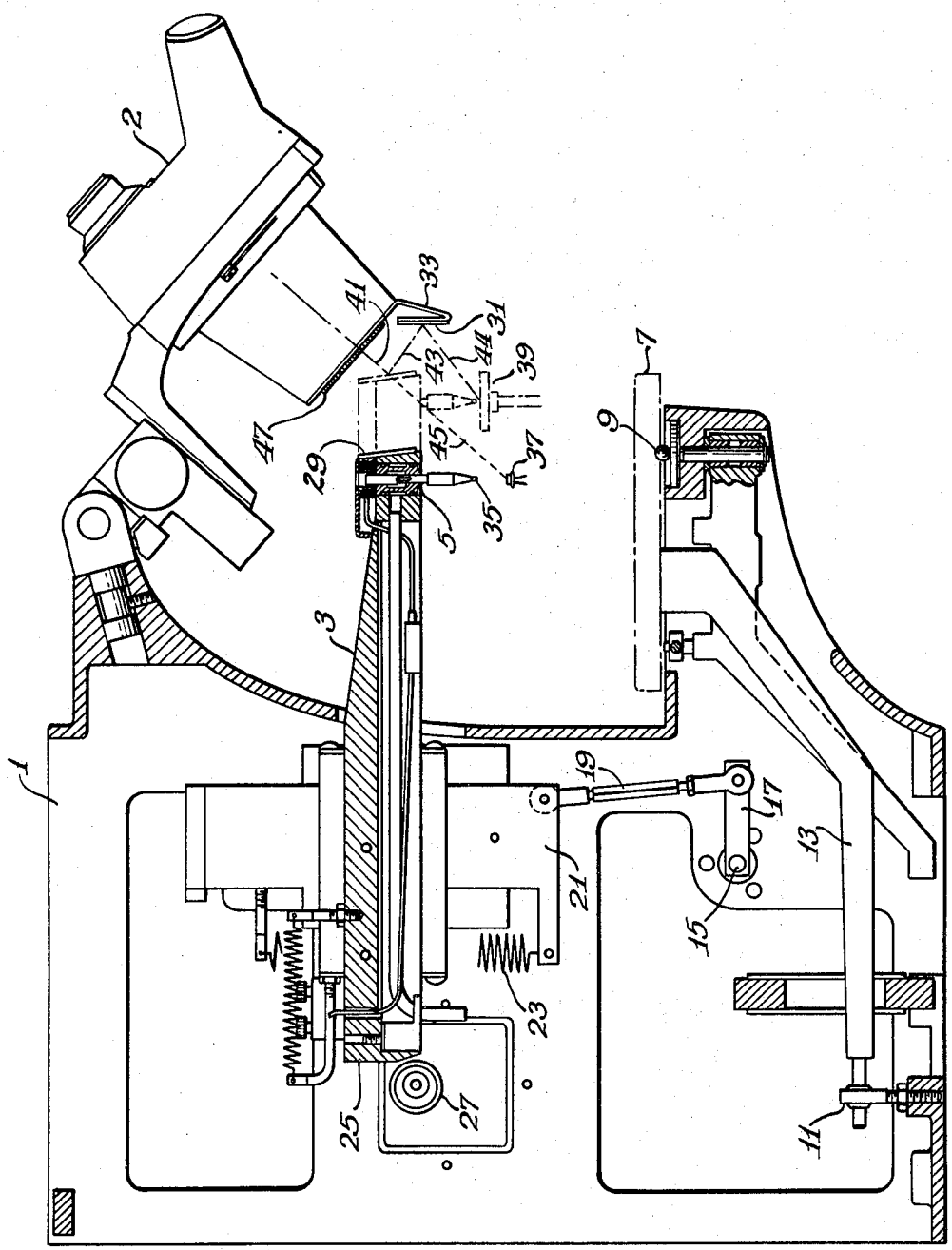

3,384,288
BONDING MACHINE SIGHTING MEANS
C. Fredrick Miller, Anaheim, Calif., assignor to Basic Products Corporation, a corporation of Wisconsin.
Filed Mar. 14, 1966, Ser. No. 534,245
3 Claims. (Cl. 228—56.5)

This invention relates to a universal machine for performing the operations of die bonding and wire bonding on partially-assembled semi-conductor pieces. Particularly, the invention relates to a novel microscope sighting means by which a single machine may be adapted to perform both die and wire bonding in the assembly of semi-conductor devices.

Heretofore, it has been necessary to use different machines to accomplish the separate operations of die bonding and wire bonding. The machine which employs the novel microscope sighting means of this invention is designed for adaptation to accomplish both die and wire operations.

Machines known in the art for performing die and wire bonding operations generally comprise a support frame, a work station either fixed or adjustable adapted to accommodate partially-completed semi-conductor headers to be worked on, a bonding needle adapted either to move up and down on a fixed vertical axis or adapted to move both horizontally and vertically by manual operator control, and means for moving and controlling the various operative parts of the machine such as cams, gears, switches, etc. In the case of wire bonders, there is also provided a source of wire either on a spool or in the form of wire segments and means to feed the wire to the work position. In the case of die bonders, there is provided a source of dies at a pick-up station which dies are picked up by the bonding needle and transported to the work station for bonding to the headers. Normally the work pieces and the dies are supported on a micromanipulator of some kind by which an operator can move the parts for pick-up and bonding.

Because of the minute size of the dies and wires it is necessary that all operations be done under a microscope. This presents problems since the microscopic sighting means can be focused on only one position at a time despite the need to move the various parts associated with the bonding operation.

In machines used to date, if the operator was to view both pickup and work stations in the case of die bonding, it was necessary to displace both stations simultaneously to bring them automatically into view. It was thus not feasible to apply manipulator control to both stations. If the manipulator control in X-Y directions was applied to the pickup needle, then this needle was moved around on the microscope field so that it was most often displaced from the center of focus. If only one station was kept in view, such as the pickup station, then bonding proceeded without monitoring and without any opportunity to affect corrective action in the case of a stubborn bond. In usual construction, the dice cup was moved by hand without mechanical advantage and usually without the opportunity of being positioned in a region of elevated temperature. And, certainly the general construction of die bonders developed to date was not possible of use for the wire bonding operation since among other things the ratio of movement by the micromanipulator was not proper for both types of bonding.

It is thus an object of this invention to provide a novel sighting means for a combination wire and die bonding machine by which said machine may be converted and used for both wire and die bonding of partially-assembled semi-conductor devices.

It is a further object of this invention to provide a novel sighting means by which a die bonding needle may be viewed in focus at both the bonding position and at the die pick-up position.

Other objects of the invention will become apparent as it is described more fully hereinafter.

Broadly, the machine which utilizes the novel sighting means of this invention comprises a frame to which is attached: (1) a work station assembly which is utilized to position and prepare by heating a partially-assembled semi-conductor work piece for further work such as die or wire bonding, (2) a horizontally-movable arm carrying at its outer end a bonding needle assembly movable vertically above the work station assembly in accordance with disclosures in my copending application Ser. No. 437,980 filed Mar. 8, 1965, for performing wire or die bonding, (3) a micromanipulator means disposed beneath the work station assembly and operable to move the work station assembly and the platform on which it is resting in response to a manually-controlled knob, and (4) the novel microscope sighting means of this invention which is described in detail hereinafter.

In the drawing, the machine including the novel line of sight mechanism is shown in side elevation.

The machine with which the novel line of sight mechanism is used comprises a supporting frame 1 to which is attached a microscope 2, and a horizontally and vertically movable arm 3 which is secured at one end to the machine frame 1 as described hereinafter and which has at its outer end a bonding needle assembly shown generally at 5. A mounting plate 7 is provided beneath the bonding needle assembly 5 and mounting plate 7 is movable horizontally in the X–Y directions by micro manipulator means described in copending application Ser. No. 533,997 filed Mar. 14, 1966. Mounting plate 7 is supported by metal balls 9 and is free to move through ball end joint 11. Linkage arm 13 connects ball end joint 11 to mounting plate 7.

Arm assembly 3 is moved vertically up and down by means of rotation of a shaft 15 to which is attached a manually-operated handle (not shown). Rotation of shaft 15 moves link 17 which in turn moves connecting link 19 up and down. This moves supporting block 21 against the tension of spring 23 and arm assembly 3 moves with block 21 to which it is connected. Arm assembly 3 is provided at its inner end with a surface 25 which contacts a rotating eccentric cam 27 to provide a lateral scrubbing movement of bonding needle assembly 5 upon signal as is described in copending application Ser. No. 533,998 filed Mar. 14, 1966.

Arm assembly 3 is moved between the position shown in the drawing and the phantom position also shown by means of an air-operated cam device (not shown). On the outer end of arm assembly 3 is a mirror 29. Depending from microscope 2 is a second mirror 31 which may be adjusted by sliding metal support bracket 33 to which mirror 31 is attached. As can be seen from the drawing, broadly speaking, the mirrors are arranged in planes such that the line of sight through microscope 2, when arm 3 is in its extended position, is focused at die pick-up station 39, indicated in phantom lines. It should also be noted from the drawing that when the arm is in retracted position, the direct line of sight from microscope 2 is to the top of work piece 37 which is in position to be contacted by the tip of needle 35 to form a work function such as die bonding.

To effect pick-up of a die from pick-up station 39, arm assembly 3 is extended by means of a pneumatic rotary actuator and cam arrangement (not shown). As the arm moves horizontally approaching its extended position, mirror 29 intercepts the line of sight 41 of microscope 2. This line of sight is then reflected from mirror 29 along line 43 to mirror 31. The line of sight is then reflected along line 44 to pick up station 39. The sum of the lengths of lines 43 and 44 is equal to the length of line 45, which length is that from the point of interception by mirror 29 to work station 37. Thus, both points 39 and 37 are viewed in focus, and at both stations needle 35 is disposed in the center of the field of view with the work being moved horizontally with respect to the fixed needle.

Focus at pick-up station 39 is accomplished by movement of the bracket 33 which is secured by locking nut 47 to the nose of microscope 2. This focus may be effected at the first surface of the pick-up station or may be effected to the underside of pick-up needle 35 as reflected through a second surface mirror in the pick-up station as described in copending application Ser. No. 534,245 filed Mar. 14, 1966.

Those skilled in the art will recognize that various modifications can be made in my invention within the scope of the invention which I intend to be limited solely by the appended claims.

I claim:

1. Apparatus for performing die and wire bonding operations on partially completed semi-conductor devices comprising a frame, first and second work stations, a microscope sighting means secured to said frame and focused on said first work station, a bonding needle supported by means movably secured to said frame for selective positioning of said needle at said first and second work stations, a first mirror secured to said bonding needle support means, a second mirror, said first and second mirrors being out of the line of sight of said microscopic sighting means when said bonding needle is positioned at said first work station, said first and second mirrors intercepting and directing said line of sight to said second work station when said needle is positioned at said second work station.

2. Apparatus of claim 1 wherein said second mirror is secured to said microscope sighting means.

3. Apparatus of claim 1 wherein the focal length from said sighting means to said first work station is substantially identical to the focal length from said microscope sighting means through said mirrors to said second work station, whereby each work station is in focus through said microscope sighting means when said bonding needle is selectively positioned at each said work station.

No references cited.

RICHARD H. EANES, JR., *Primary Examiner.*